No. 675,604. Patented June 4, 1901.
A. MEUSCHEL.
SPEED REGULATOR FOR PRIME MOTORS.
(Application filed Feb. 26, 1901.)
(No Model.) 6 Sheets—Sheet 1.
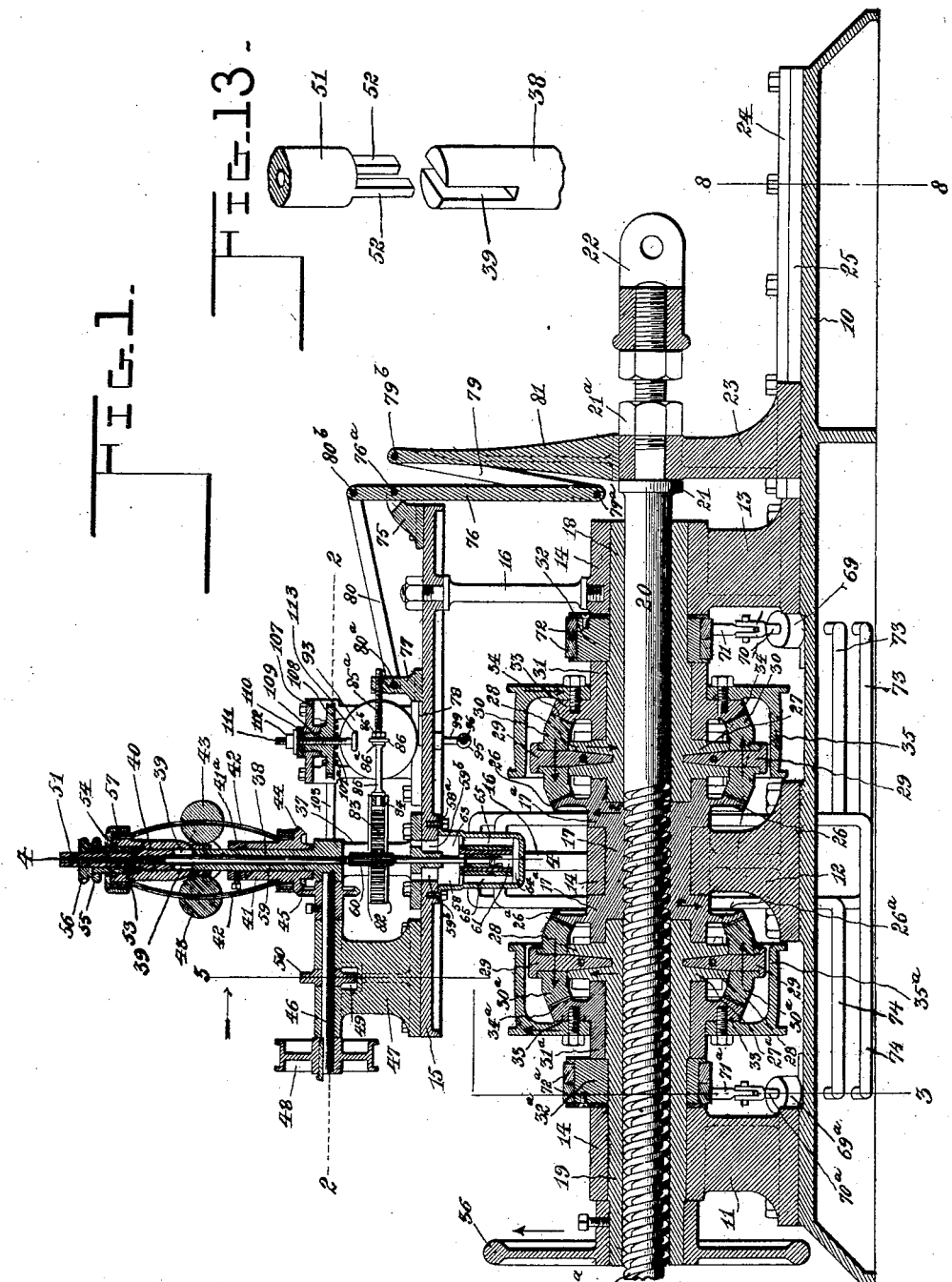
Witnesses:
J. F. Groat.
H. F. Berulta
August Meuschel Inventor
By Marion & Marion
Attorneys

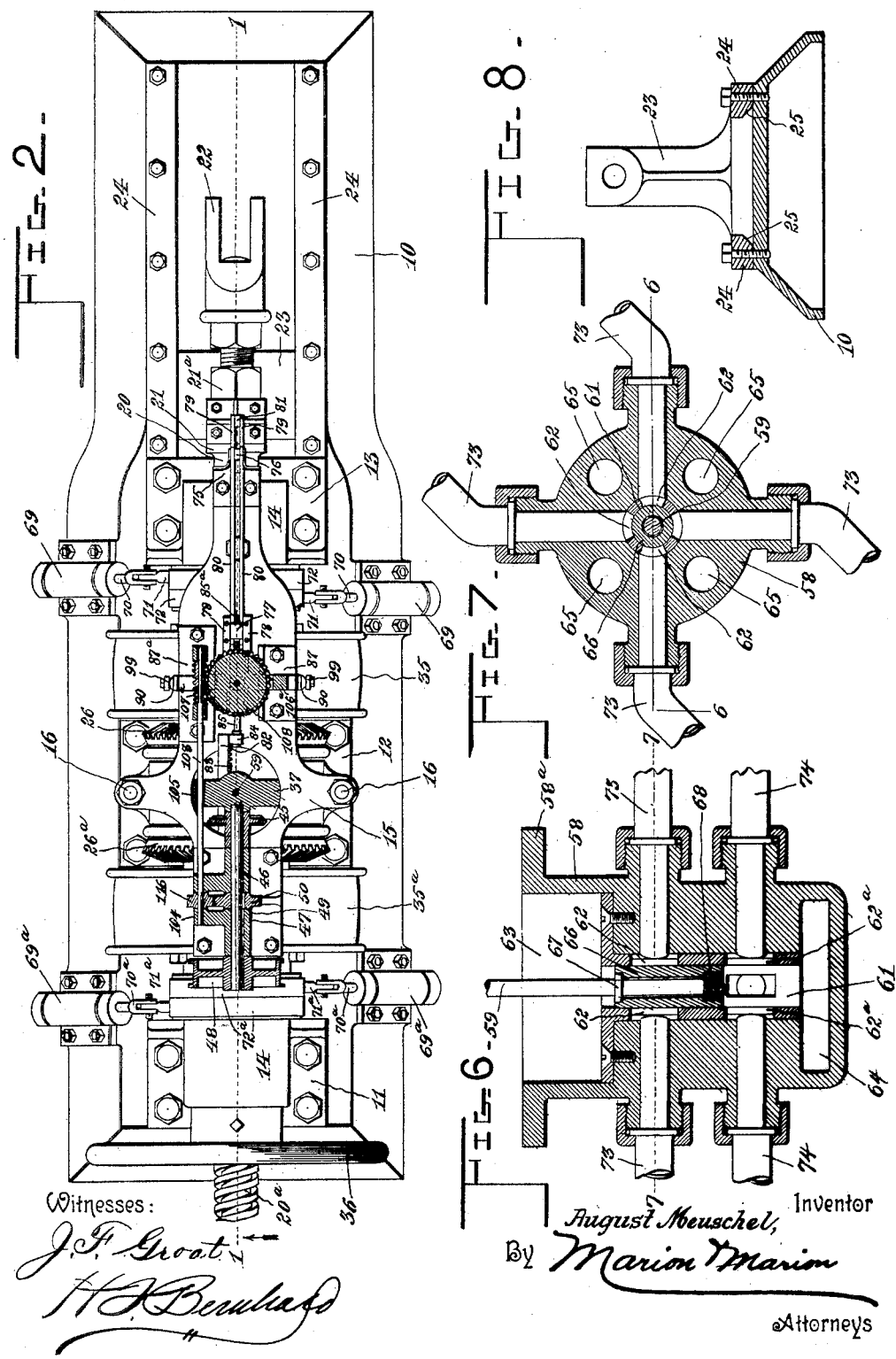

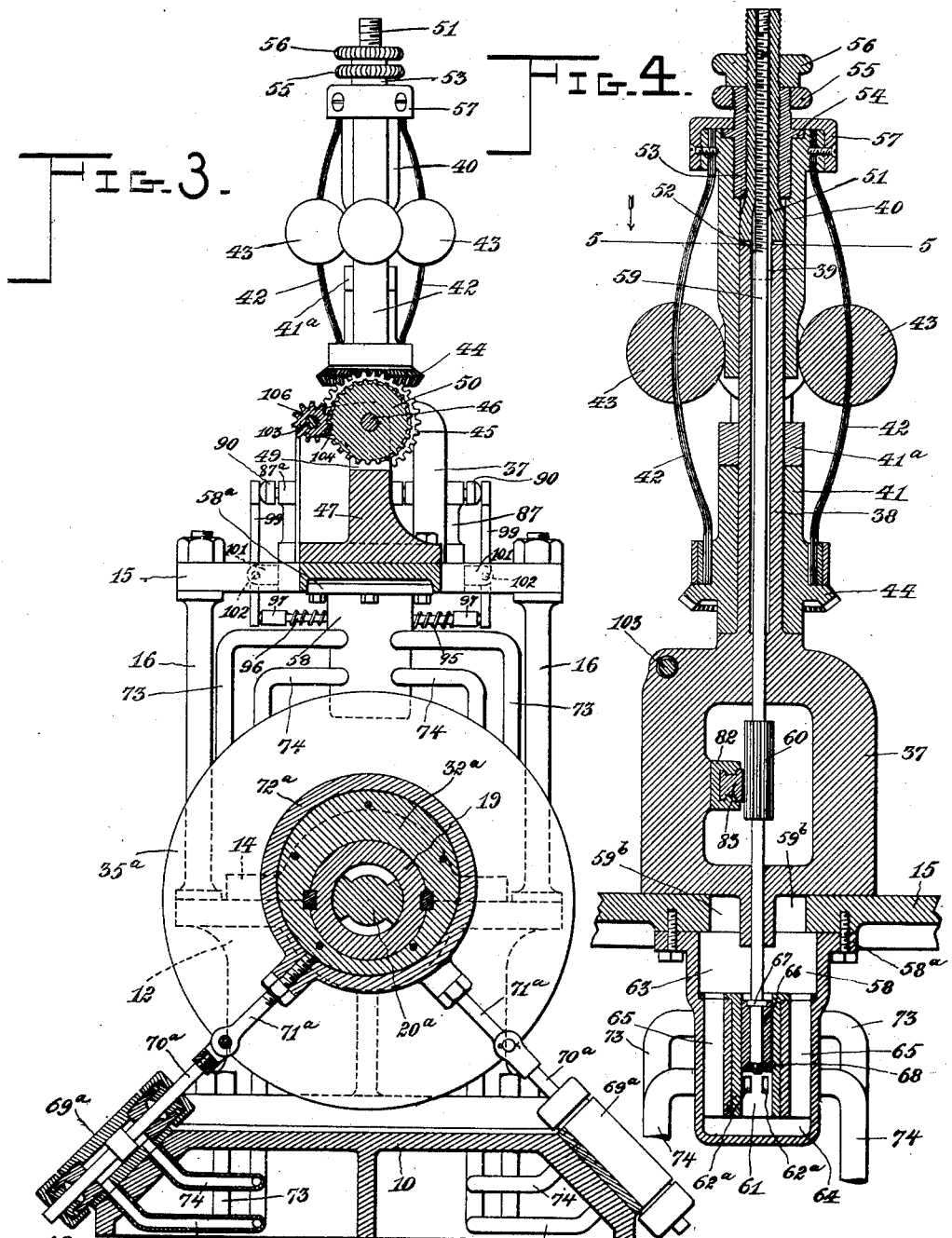

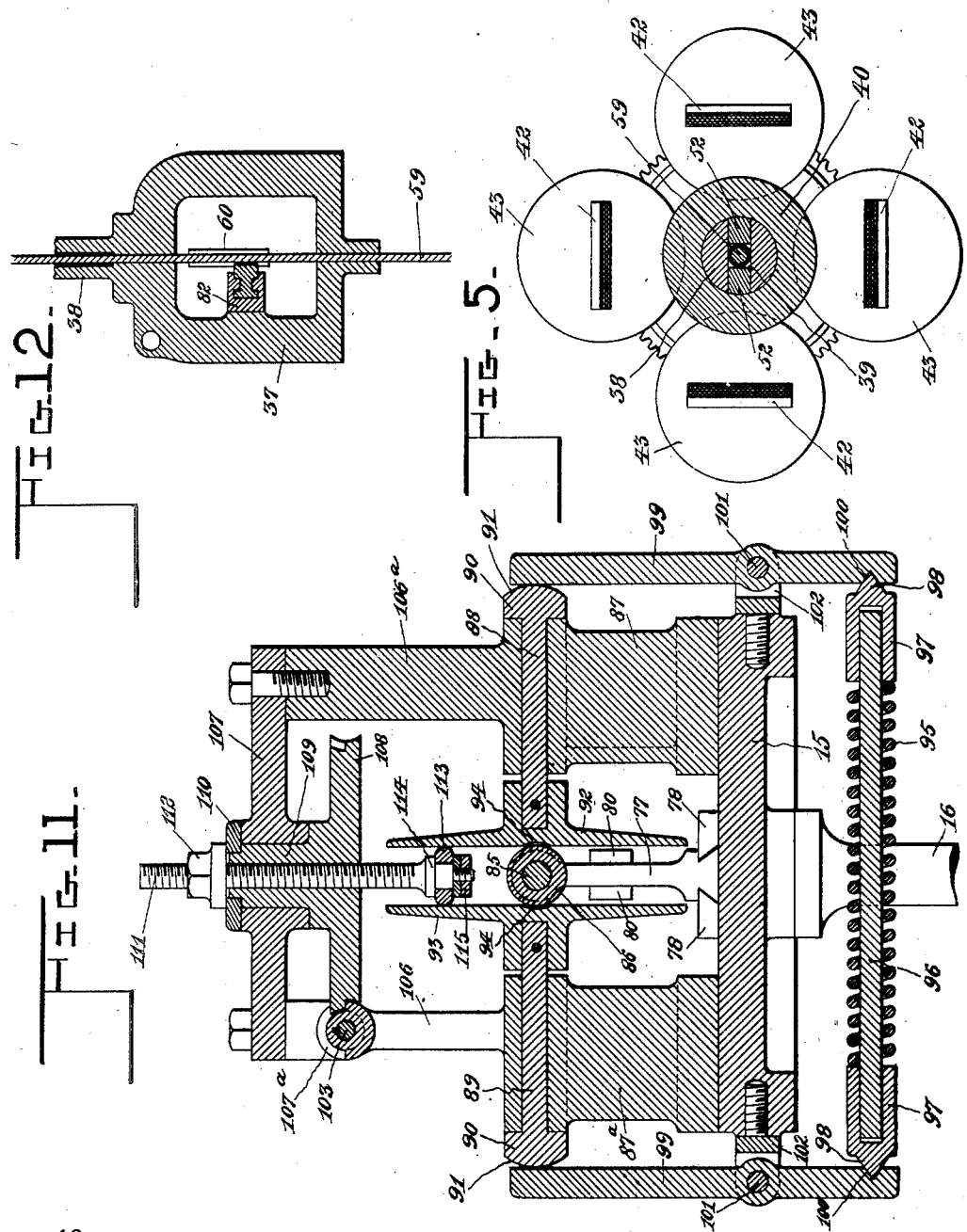

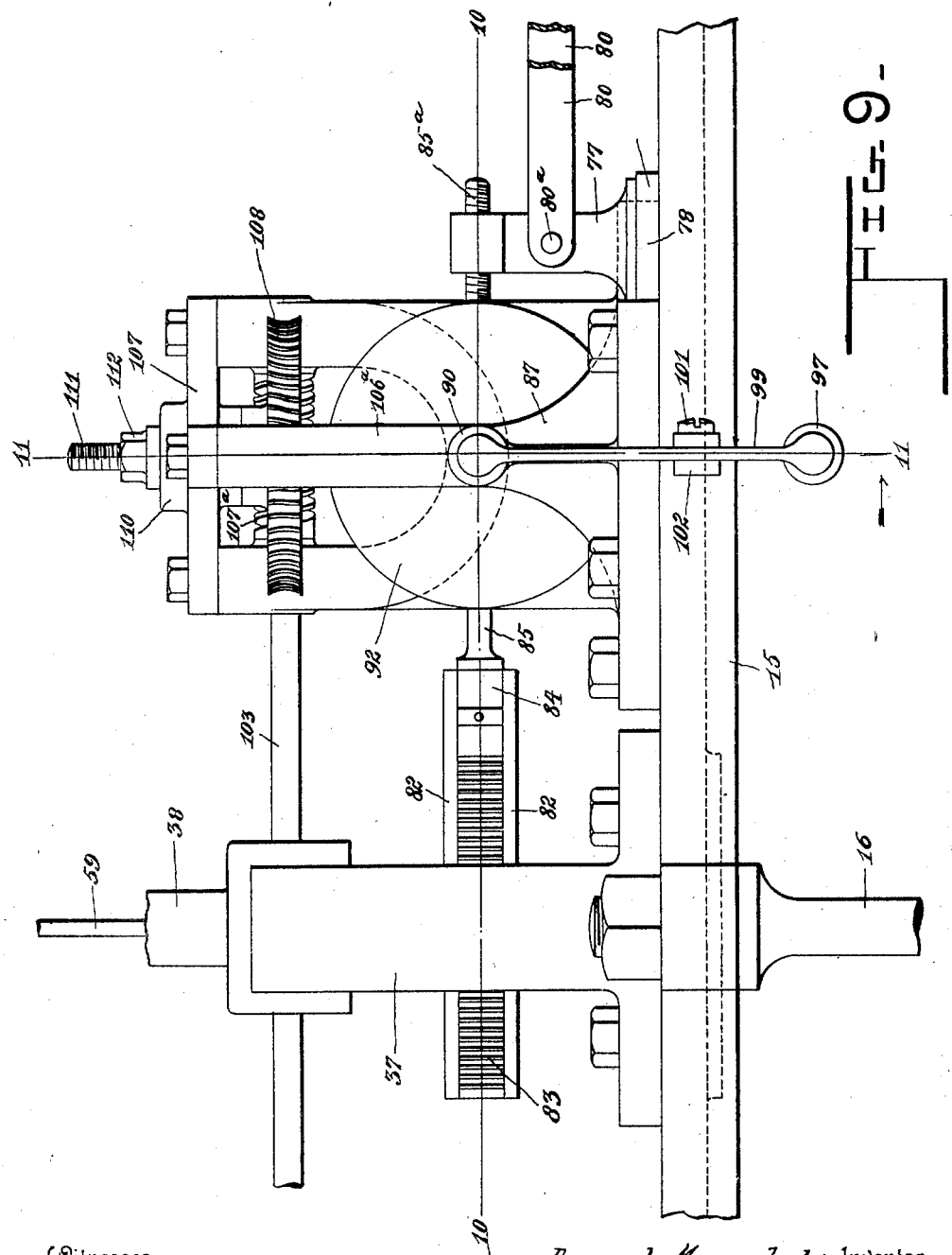

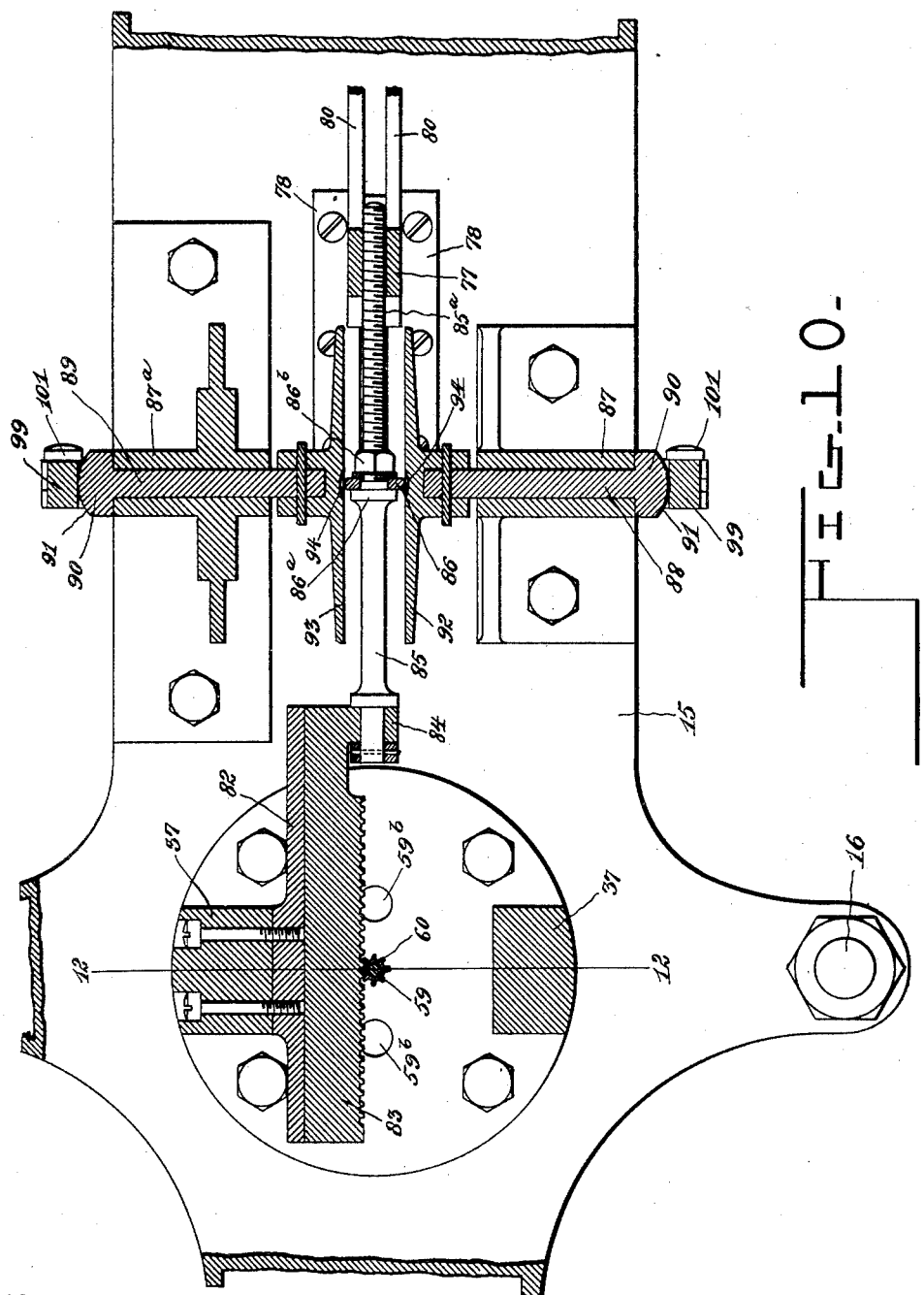

UNITED STATES PATENT OFFICE.

AUGUST MEUSCHEL, OF MONTREAL, CANADA.

SPEED-REGULATOR FOR PRIME MOTORS.

SPECIFICATION forming part of Letters Patent No. 675,604, dated June 4, 1901.

Application filed February 26, 1901. Serial No. 49,017. (No model.)

*To all whom it may concern:*

Be it known that I, AUGUST MEUSCHEL, residing at the city and district of Montreal, Province of Quebec, Canada, have invented certain new and useful Improvements in Speed-Regulators for Prime Motors; and I do hereby declare that the following is a full, clear, and exact description of the invention, such as will enable others skilled in the art to which it appertains to make and use the same.

My invention relates to speed-regulators for prime motors, such as water motors or turbines, although the principle of the regulator may be utilized in the speed regulation of other types of motors.

The chief purpose of my invention is to control the motor (or turbine) automatically, so as to maintain with perfect reliability a practically constant speed.

In modern generation and transmission plants, where the demand on the water-power changes continuously by variation in the load of the working circuit supplied by a generator, the employment of my automatic regulator secures the maintenance of a constant speed of the generator, owing to an automatic regulation of the turbine-gates which control the admission of the water-power to the turbine.

One improvement which I have made is a novel form of positive gate-actuating mechanism held normally at rest by an equalization in a resistance mechanism and set automatically in service by a variation in the speed of a governor mechanism. This gate-actuating mechanism contemplates an endwise-movable threaded gate-moving spindle, a revoluble and non-slidable nut having threaded engagement with said spindle and provided with oppositely-facing gear elements, tubular shafts concentric with and revoluble freely with respect to said gate-moving spindle, motor-driven devices fast with the tubular shafts and adapted to be propelled in opposite directions at the same angular velocity, and independent trains of planet-gears between the motor-driven elements and the gear elements of the revoluble nut, the latter being at rest under normal speed conditions by equal friction resistance from the trains of planet-gears and by equal resistance in the oppositely-disposed elements of the resistance mechanism. The governor is of the centrifugal variety, motor-driven by suitable gear appliances, and is operatively related to the power-valve of the resistance mechanism. One type of the resistance mechanism which I may employ contemplates the provision of pumps, a valve, and circulation-passages adapted to receive a suitable fluid which constitutes an elastic medium adapted to transmit the action of the centrifugal governor in an especially sensitive and reliable manner, said pumps of the resistance mechanism being connected operatively with the tubular shafts of the gate-actuating mechanism, so as to offer under normal speed conditions an equal resistance to the shafts and assist in maintaining the nut of the gate-actuating mechanism at rest. With the gate-actuating mechanism and the power-valve of the resistance mechanism I have combined an anticipating mechanism, which in its action on the power-valve under disturbed conditions in the resistance mechanism anticipates the gradual development of water momentum after change of load has displaced said valve by returning the latter to its midway position before the motor-gate arrives at its proper position for the required water-supply, thus overcoming a tendency of the motor to "race" as a result of the water momentum. To restore the valve-actuating element of the anticipating mechanism to its normal or midway position, and thereby prevent the turbine speed from changing with every new gate position, I employ a return mechanism which normally has no influence upon said valve-actuating element, but which return mechanism is positively driven at the required speed through suitable transmitting devices that derive motion from the centrifugal-governor-driving shaft. Said return mechanism in action will exactly conform to different speeds of gate movement and in a great measure conduce to a close speed-regulation of the motor.

The invention consists in the novel combination of mechanisms, instrumentalities, and devices; also, in the construction and arrangement of parts, as will be hereinafter fully described and claimed.

To enable others to understand the invention, I have illustrated a preferred embodiment thereof in the accompanying drawings, in which—

Figure 1 is a vertical sectional elevation through an automatic speed-governor for water-motors constructed in accordance with my invention, the plane of the section being indicated by the dotted line 1 1 on Fig. 2 looking in the direction of the arrow. Fig. 2 is a sectional plan view of the improved regulator on the same scale as Fig. 1, the plane of the section being taken through the centrifugal governor and the driving mechanism for the return and anticipating devices, said section being indicated by the dotted line 2 2 on Fig. 1. Fig. 3 is a vertical transverse sectional elevation, on an enlarged scale, the plane of the section being indicated by the irregular and dotted line 3 3 on Fig. 1 looking in the direction of the arrow. Fig. 4 is a sectional elevation, on a still larger scale, through the centrifugal governor and in a plane at right angles to that of Fig. 1, the plane of the section being indicated by the dotted line 4 4 on Fig. 1. Fig. 5 is a transverse section through the governor in the plane of the dotted line 5 5 on Fig. 4 looking downwardly, as shown by the arrow. Fig. 6 is an enlarged vertical section through the power-valve which is associated with the resistance mechanism, the plane of the section being indicated by the dotted line 6 6 on Fig. 7. Fig. 7 is a sectional plan of the power-valve on the line 7 7 of Fig. 6. Fig. 8 is a cross-section through the bed-plate on the line 8 8 of Fig. 1. Fig. 9 is an elevation, on an enlarged scale, of a part of the anticipating mechanism and a part of the return mechanism. Fig. 10 is a sectional plan view through the mechanism shown by Fig. 9 and in the plane indicated by the dotted line 10 10 on Fig. 9. Fig. 11 is a vertical transverse section on the line 11 11 of Fig. 9 looking in the direction of the arrow. Fig. 12 is a detail cross-section, on a reduced scale, taken in the plane of the dotted line 12 12 on Fig. 10. Fig. 13 is a detail view of a part of the governor.

The same numerals of reference denote like and corresponding parts in each figure of the drawings.

The general framework for supporting the operating parts of the apparatus comprises a bed 10, a series of pillars 11 12 13, each provided with a shaft-bearing 14, an elevated supporting-plate 15, and posts 16 for upholding said plate. The bed 10 is of elongated form and of any suitable design for supporting the parts to be mounted thereon. The series of pillars are secured to the bed in any approved way and arranged for the series of bearings 14 to be in alinement with each other. Said supporting-plate 15 occupies a horizontal position at a suitable elevation above the bed, parallel with the latter, and one of the posts 16 is secured to the bearing of the pillar 13, while two of the other posts 16 are fastened to the pillar 12. (See Figs. 1, 2, and 3.)

I will now proceed to describe the gate-actuating mechanism, which, it is to be observed, is positive in its operation. In the bearing 14 of the post 12 is mounted a revoluble non-slidable nut 17, while in the bearings of the other pillars 11 13 are journaled the tubular shafts 18 19, all these parts being in alinement axially one with the other. Said nut occupies a horizontal position and is disposed centrally relative to the bearing of the pillar 12, in which it must be mounted so as to be capable of free rotation on its axis, and at the same time it is held or confined against endwise or slidable movement. This end is attained by the provision of a wide circumferential groove in the nut which forms the flanges 17$^a$, adapted to abut against the pillar-bearing. The nut is furthermore provided with an internally-threaded axial bore or passage, the ends of which are enlarged, as shown by Fig. 1, so as to produce annular recesses adapted to loosely receive the inner approximate ends of the tubular shafts 18 19, whereby said shafts have their outer end portions mounted in the bearings of the pillars 11 13, while their inner ends are partly supported by the nut 17. A gate-moving spindle 20 extends loosely through the tubular shafts 18 19, and it is provided for a part of its length with a male screw-thread 20$^a$, the latter engaging with the female thread of the nut 17. This spindle has a cylindrical part which is fitted loosely in the shaft 18, while its threaded part engages with the nut and extends loosely through the other tubular shaft 19, whereby rotation of the nut 17 on its axis imparts a sliding or endwise movement to said spindle 20. The spindle is prevented from turning on its axis by having fixed engagement with a slidable cross-head 23, the latter being arranged to travel with the spindle and having slidable engagement with the bed. The cylindrical part of the spindle extends beyond the bearing of the pillar 13 and is provided with an annular collar 21 and with a threaded stem, said stem extending through the cross-head 23, so that the collar 21 may abut the cross-head, whereby a nut 21$^a$ may be screwed on the stem to bear against the cross-head, thus making the collar and the nut coact in clamping the stem and cross-head firmly together. The extremity of the stem receives a coupling 22, by which the spindle may be connected operatively with a turbine-gate. (Not shown.) The foot of the slidable cross-head 23 is widened and beveled in order that said cross-head may have dovetailed engagement with a guide or way which is provided on the bed 10 by securing suitable longitudinal parallel plates 24, the inner edges of said plates being undercut or beveled, as at 25. (See Fig. 8.)

The nut 17 exceeds the width of its bearing in the pillar 12, thus exposing the end portions of the nut to loosely receive the inner ends of the tubular shafts, and said nut is provided at or near its end portions with the gear elements 26 26ª, the same being preferably embodied as beveled gears and arranged for the teeth thereof to face in opposite directions. (See Figs. 1 and 2.) These gear elements may be integral with the nut, so as to be exposed circumferentially thereon; but, if desired, the gear elements may be fastened to the nut. The tubular shafts 18 19 are provided near their inner ends with annular flanges 27 27ª, and these shafts and the nut are relatively disposed for said flanges 27 27ª to abut against the end edges of the nut 17. Furthermore, each tubular shaft has its flange formed with one or more short radial posts 28, the same receiving the radially-disposed gear-arbors 29, on which are loosely mounted certain planet-gears. The planet-gears on the arbor or arbors fastened to the tubular shaft 18 are indicated by the numeral 30 and arranged to have toothed engagement with the gear element 26 on the revoluble nut 17; but, on the other hand, the planet-gears for the arbors attached to the tubular shaft 19 are indicated by the numeral 30ª and arranged to intermesh with the gear element 26ª on the other end of the nut. Loosely fitted on the tubular shafts 18 19, beyond the annular flanges 27 27ª thereof, are the short sleeves 31 31ª, the same arranged to abut against said annular flanges of the shafts, and these shafts are furthermore provided with the eccentrics 32 32ª, the same being keyed or otherwise made fast to the respective shafts and disposed between the short sleeves 31 31ª and the bearings in the pillars 11 13, respectively, whereby all the parts are compactly disposed, and they are each prevented from having endwise play, which is likely to produce lost motion. The short sleeves heretofore described as mounted on the short tubular shafts are adapted to carry the motor-driven elements of the gate-actuating mechanism, while the eccentrics, also provided on the tubular shafts, actuate the fluid-circulating pumps of the resistance mechanism. Said sleeves 31 31ª are provided with the annular flanges 33, which have beveled gear-teeth cut thereon in a manner to form the beveled gears 34 34ª on said sleeves 31 31ª, respectively, and these annular flanges of the short sleeves also provide means for the attachment of the motor-driven elements 35 35ª to the short sleeves. The motor-driven elements are preferably in the form of pulleys, each bolted to the flange of one short sleeve and arranged to house one of the beveled gears 34 or 34ª and to partly house the intermediate planet-gears 30 or 30ª. The beveled gears 34 34ª on the short sleeves are arranged to face or oppose the beveled gears 26 26ª, respectively, of the nut 17, and between the opposing gears 26 34 of the nut and the short sleeve 31 are disposed the planet-gears 30 on the tubular shaft 18, which planet-gears have intermeshing engagement with the stationary gear element 26 and the beveled gear 34, while between the gear element 26ª at the opposite end of the nut and the bevel-gear 34ª on the short sleeve 31ª are arranged the planet-gears 30ª of the tubular shaft 19, said planet-gears 30ª engaging with the gear element 26ª and the bevel-gear 34ª. It will thus be seen that each tubular shaft has one or more gears which intermesh with a gear element on a normal stationary nut and a bevel-gear on a short sleeve which is driven positively by a motor-driven pulley or element. These motor-driven elements 35 35ª are adapted to be propelled from a motor-shaft, the pulley 35 being positively driven in one direction by a crossed belt, while the other pulley 35ª is driven in an opposite direction by a straight belt, the motor-pulleys (not shown) for driving these belts being of equal diameter, whereby the two pulleys 35 35ª are adapted to rotate in opposite directions and at equal angular speed.

The tubular shaft 19 is extended at its outer end beyond its bearing in the post 11, and to this extended extremity of said tubular shaft is firmly secured a hand-wheel 36, the same adapted to be turned by the hand for the purpose of rotating one of the tubular shafts to impart the initial movement to the apparatus in starting the same into service.

The prime factor of the improved regulator is a centrifugal governor, (shown by Figs. 1 to 4, inclusive,) and preferably of a variety well known to engineers. This governor in my apparatus is somewhat similar in its action to the corresponding mechanism used in prior regulator systems which contemplate the employment of a resistance mechanism having a circulating fluid; but as it is necessary to slightly modify the construction of this centrifugal governor in employing the same in my system I will now proceed to describe the detailed construction of this mechanism.

A vertical stand 37 is bolted or otherwise firmly secured to the elevated supporting-plate 15 of the framework. This stand has a tubular column 38 made as an integral part thereof, said column extending upwardly for a suitable distance from the stand, as shown more clearly by Fig. 4, and provided at its upper portion with the longitudinal slots 39. (See Fig. 1.) The rotary elements of the governor are the head member 40 and the foot member 41, the same being embodied in the form of sleeves which are fitted loosely on the tubular column, and these sleeve members are connected or joined together by the strong bowed springs 42, which carry the weights 43. The foot member 41 of the governor is adapted to rest on the stand and to be held against endwise movement by a collar 41ª, which is clamped to the column, said foot member being provided with a bevel-gear 44, which has intermeshing engagement with a driving-gear 45, whereby the governor is positively rotated on the tubular column. This driving-gear 45 is made fast with the inner end of a horizontal governor-driving shaft 46, the same being suitably journaled in a bearing of the pillar 47, firmly attached to an end portion of the elevated plate 15, said shaft 46 having a driving-pulley 48 secured to its outer end and adapted to receive a belt which is propelled from the motor. The pillar 47 is formed with a central recess 49, in which is arranged a spur-gear 50, the latter being made fast with the governor-driving shaft 46 and adapted to propel a shaft for the driving-gear of the return mechanism, which will be hereinafter fully described. The centrifugal governor includes an adjusting-sleeve 51, the same being slotted at its lower portion to form the branches 52, which are loosely fitted in the slots 39 at the upper portion of the tubular column 38, whereby the adjusting-sleeve 51 is keyed to the column, the sleeve is prevented from rotating on the column with the head member and the governor, and said sleeve is limited to a slidable movement in a vertical direction with relation to said column. The sleeve is formed with an internal or female thread of the left hand adapted to engage with a male thread at the upper end of a valve-spindle 59, and this sleeve 51 is furthermore provided with an external or male thread, with which engages another sleeve 53, the same partly surrounding the adjustable sleeve 51 and being fixed or clamped securely thereto. This governor-sleeve 53 is fitted loosely in a recessed upper portion of the head member 40, and it is provided with an annular collar 54, that is seated upon the head member. The governor-sleeve 53 is furthermore provided with a thumb-nut 55, which is removably screwed thereto and furnishes a means for turning the sleeve; but said governor-sleeve 53, which has a threaded engagement with the adjusting-sleeve 51, is held in fast engagement with said adjusting-sleeve by means of a lock-nut 56, the latter being screwed on the adjusting-sleeve and binding against the end of the governor-sleeve 53. (See Fig. 4.) The governor-sleeve is confined on the head member 40 by a cap 57, which embraces the head member and the collar 54 of the governor-sleeve, whereby said governor-sleeve has a swiveled connection with the head member and is fixed on the adjusting-sleeve.

From the foregoing description it will be noted that the foot member 41 of the governor is positively driven from the shaft 46 and is confined against endwise movement on the tubular column; but the head member 40 is fitted loosely on the tubular column in order that it may have the desired rotation with the foot member, and it is also capable of a limited slidable movement on the tubular column, owing to the centrifugal action of the weighted springs. This slidable movement of the head member 40 is communicated to the governor-sleeve because the latter has a swiveled engagement with the head member, and as the governor-sleeve is fixed on the adjusting-sleeve 51 by having a threaded engagement therewith and by the action of the lock-nut 56 it is clear that the adjusting-sleeve 51 will partake of the slidable movement of the governor member 41 and the governor-sleeve 53, whereby said adjusting-sleeve is adapted to be automatically shifted by a variation in the speed of the governor, so as to change the position of the valve-spindle 59, the latter forming an element of the resistance mechanism.

The resistance mechanism which I prefer to employ contemplates the use of a liquid as a circulating medium which is adapted under normal conditions to equalize the resistance of the operation of the trains of planet-gears associated with the respective tubular shafts 18 19 and the nut 17; but the circulation of fluid in one part of the resistance system is adapted to be retarded or arrested under a change of load, which effects a corresponding variation in the speed of the centrifugal governor, whereby the trains of planet-gears are unequally opposed and the nut 17 is adapted to be rotated in one direction, so as to give endwise movement to the gate-actuating spindle 20.

A valve-pot 58 depends from the elevated plate 15, said pot having an annular flange $58^a$, which is bolted to the plate, whereby the pot is arranged in vertical alinement with the centrifugal governor. The valve-spindle 59 is fitted in the stand 37 and in the tubular column thereof so as to be capable of free rotation and endwise movement therein, the upper part of said valve-spindle having a left-hand male thread, which screws into the female thread of the adjusting-sleeve 51. Said valve-spindle extends through the stand and into the valve-pot, and at a point intermediate of its length the spindle is provided with an elongated gear-pinion 60, which is adapted to have intermeshing engagement at all times with a horizontally-slidable rack, forming an element of the anticipating mechanism. The valve-pot, which is shown more clearly by Figs. 4, 6, and 7, is provided with a valve-chamber 61, the same having an upper series of vertically-rectangular ports 62 and a lower series of ports $62^a$, also of rectangular form. Each series or group of ports is four in number, with the ports of one series of corresponding area and form, and thus the aggregate area of one group of ports is equal to that of the other group of ports. Furthermore, the valve-pot is provided at its upper portion with a feed-chamber 63, at its lower portion with a foot-chamber 64, and with a series of by-pass passages 65, the latter being formed in the valve-pot around the valve-chamber, but not communicating directly therewith, and said passages 65 being in communication with the chambers 63 64 in order to secure free circulation of the liquid through said chambers and the valve-chamber. Finally, the valve-pot is open at its upper end, as shown by Figs. 4 and 6, and feed-holes $59^b$ are provided in the stand 37 and the elevated plate 15 (see Fig. 1) for the purpose of enabling an attendant to easily replenish the supply of oil or other fluid in the valve-pot, thus keeping the circulation systems of the resistance mechanism filled with liquid to the exclusion of air.

The revoluble and slidable valve-spindle 59 carries a valve 66 at its lower portion, said valve being loosely fitted in the valve-chamber 61 and connected loosely with the valve-spindle, so as to reduce friction and wear on the parts. Said valve abuts at its upper end against a collar 67 on the spindle and is held against downward movement relative to the spindle by means of the nut 68, the latter being screwed on the threaded lower extremity of the spindle, as shown by Fig. 6. The valve is thus connected with the spindle to partake of its vertical slidable movement; but the valve is not so firmly attached to the spindle that it will rotate therewith when the spindle is rotated on its axis by the action of the anticipating mechanism.

The circulating systems for the liquid of the resistance mechanism comprises two pairs of pumps 69 69 and 69$^a$ 69$^a$ and an arrangement of piping whereby one pair of pumps are connected with one group of ports in the valve-pot and the other pair of pumps are connected with the other group of ports in the valve-pot. The pair of pumps 69 are located to the right of the revoluble nut, and they are fixed in angular positions on opposite sides of the bed 10 by any suitable means. This pair of pumps are connected with the upper group of ports 62 by the series of four pipes 73, each of which pipes has one end coupled to the valve-pot by any suitable means, so as to be in communication with one of the ports 62, while the other end of each pipe is connected to one of the pumps, said pipes 73 being so disposed that the liquid in certain positions of the valve 66 will circulate freely to and from the valve-pot and the group of pumps 69. The other pair of pumps 69$^a$ are secured in angular positions on opposite sides of the bed 10 and to the left-hand side of the revoluble nut 17, and these pumps are connected by the pipes 74 with the lower group of ports 62$^a$ of the valve-pot, said pipes 74 being arranged to establish communication between the group of pumps 69$^a$ and said lower group of ports to effect the desired circulation of the liquid between the left-hand couple of pumps and said lower ports of the valve-pot. The center lines of each pair of pumps forming one group or couple are inclined to each other at an angle of ninety degrees, or thereabout, so that the united action of the pumps during one cycle is practically uniform. The pumps 69 have the plungers 70 connected pivotally to the connecting-rods 71, the latter being attached to the eccentric-straps 72, which are fitted to the eccentrics 32, while the other pair of pumps 69$^a$ have the plungers 70$^a$ connected to the rods 71$^a$, secured to the straps 72$^a$, that are fitted loosely on the eccentric 32$^a$. The pumps comprising the two pairs are thus adapted to have their plungers driven positively from the eccentrics on the tubular shafts 18 19, and in a midway normal position of the valve 66 the liquid is adapted to circulate freely through the pumps, the pipes, and the valve-pot, so as to secure uniform resistance in both the circulating systems which oppose the two trains of planet-gears.

The anticipating mechanism which will now be described is connected operatively with the slidable gate-actuating spindle and with the spindle of the power-valve which controls the circulation of liquid through the resistance mechanism. On the supporting-plate 15, at or near the right-hand end thereof, is rigidly secured a bracket 75, to which is fulcrumed a lever 76 by means of a pin or bolt 76$^a$, the latter passing through the lever at a point intermediate of the length thereof and forming long and short arms at the lower and upper portions, respectively, of said lever. The supporting-plate 15 is provided with a horizontal longitudinal guideway 78, which is formed by a pair of plates suitably secured to said supporting-plate 15, and in this guideway is slidably fitted an upstanding cross-head 77, the same being limited to rectilinear sliding movement in a horizontal plane with respect to the valve-spindle 59. The short arm of the lever 76 is connected operatively with the cross-head 77 by means of an intermediate link 80, one end of which is connected to the cross-head by a pivot-pin 80$^a$, and the other end of the short arm of the lever is connected by a pivot-pin 80$^b$. To the long arm of the lever 76 are connected links 79 by means of the pivot-pin 79$^a$, the opposite ends of said links being connected by a pivot-pin 79$^b$ to the upper extremity of a slidable post 81, which is secured firmly to the upper part of the cross-head 23, whereby the post is mounted on the cross-head and adapted to travel in a horizontal path therewith. It will be observed that the pivot-pin 79$^b$, the fulcrum-pin 76$^a$, and the pivot-pin 80$^a$ are all disposed in the same horizontal plane, and this relative arrangement of the pivot-pins is maintained in every position of the gate. By reason of this disposition of the elements the travel of the cross-head 77 is always proportional to the travel of the cross-head 23, associated with the gate-actuating spindle. If desired, means may be provided for adjusting the lever 76 relative to the bracket 75, so as to vary the arc of movement which may be given to the lever, and, furthermore, the upper short arm of said lever may be arranged at an angle to the lower longer arm of the lever. Such a construction is especially useful in cases where the governor is required to regulate for exceptionally light loads. Furthermore, the pivot-pin 80$^b$, which connects the link 80 to the short arm of the lever, may be arranged so as to be shifted on the lever, thus varying the effective length of the leverarm and correspondingly changing the range of action of the anticipating mechanism.

The stand 37 is provided with a horizontal guide-box 82, in which is slidably mounted the rack 83 of the anticipating mechanism, said rack having flanged engagement with the guide-box, as shown by Fig. 4, so as to effectively limit the rack to rectilinear endwise movement. This rack is provided at one end with a lug 84, in which is loosely fitted one end of a horizontal spindle 85, the same having a swiveled connection with the rack and a threaded connection with the slidable cross-head 77. Said spindle 85 is threaded for about one-half of its length, as at 85$^a$, and is adapted to be screwed into a female thread provided in the cross-head; but the other end of said spindle has a swiveled connection with the lug 84 of the rack 83, whereby the spindle is adapted to rotate on its axis without affecting the position of the rack 83 and to move the cross-head 77 back or forth, as may be necessary, said spindle being also capable of an endwise or slidable travel when the cross-head 77 is moved by the action of the lever 76. This lever through the links 79 80 communicates the traveling motion of the post 81 and the cross-head 23 to the cross-head 77 of the anticipating mechanism, thence through the spindle 85 to the rack 83, which is in engagement with the elongated gear-pinion 60 of the valve-spindle, whereby the rotary motion imparted to the valve-spindle by the action of the anticipating mechanism (subsequent to displacement of the valve to effect a difference in the resistance of the complemental parts of the circulating system, which is a part of the resistance mechanism) causes said spindle to move in a downward or upward direction and restore the valve to its midway position, owing to the threaded engagement of the upper extremity of the valve-spindle 59 with the adjusting-sleeve 51.

The revoluble and slidable spindle 85 of the anticipating mechanism is provided between its smooth and threaded lengths with a friction-wheel 86, which may be made of hard fiber or any other suitable material and is clamped rigidly to the spindle by and between a collar 86$^a$ and a nut 86$^b$, whereby the friction-wheel is made fast with the spindle for the purpose of rotating the latter whenever the spindle is shifted out of a normal position wherein it remains at rest. Displacement of this spindle from said normal position by the action of the anticipating mechanism brings into service the return mechanism, which operates automatically to restore the spindle back to its normal position irrespective of the position of the anticipating mechanism.

A pair of bearing-posts 87 87$^a$ are secured firmly to the supporting-plate 15 at the right-hand side of the stand 37 in Fig. 1, and in these posts are journaled the horizontal shafts 88 89, the latter being provided at their outer ends with the stop-collars 90, which limit the movement of the shafts inwardly toward each other under the action of the expansion-spring 95. Said shafts are disposed in alinement with each other, and they are provided at their inner approximate ends with the friction-disks 92 93, the same being secured firmly to the shafts, so as to rotate therewith, and said disks being disposed in parallel relation and at a suitable distance apart for the friction-wheel 86 to be received between their opposing faces. Said disks 92 93 have the central pockets 94 formed in their opposing faces, these pockets serving to increase the distance between the central portions of the disks, so that the friction-wheel 86 may in the normal position of the spindle 85 occupy a central relation to said disks and entirely free from frictional engagement therewith. When the spindle 85 is moved endwise toward the left hand in Fig. 1 by the action of the anticipating mechanism, the friction-disk 86 is moved beyond the central pockets 94 of the disks and into frictional engagement with the disks sufficient to rotate the frictional wheel 86 and the spindle 85, whereby the friction-disks become operative to restore the spindle 85 to its normal position without changing the position of the cross-head 77 and serving to impart the desired slidable travel to the rack 83. The extension-spring 95 is disposed below the supporting-plate 15 and fitted loosely on a horizontal rod 96, the end portions of which are loosely received in the bearing-cups 97, the latter having the pointed ends 98 fitting loosely in the sockets 100, which are provided near the lower end portions of the levers 99. Said levers occupy upright positions on opposite sides of the supporting-plate 15, and each is fulcrumed at a point intermediate of its length, as at 101, in a bracket 102, secured to a side edge of the plate 15. The lower ends of the levers 99 are normally forced apart by the action of the spring 95, thus impelling the upper ends of the levers inwardly toward each other and into engagement with the rounded ends or faces 91 of the stop-collars on the shafts 88 89, whereby the shafts and the disks are yieldingly held in operative relation to each other by the action of the spring; but the inward movement of the disks is arrested by the stop-collars impinging the bearing-posts 87 87$^a$. The rounded faces 91 of the shafts minimize the engagement of the levers therewith, thus reducing the friction and wear.

The disks 92 93 are driven positively and in opposite direction to each other by means of devices propelled from the governor-driving shaft 46, as will now be described. A horizontal shaft 103 is journaled in the bearing 104 of the pillar 47, a bearing 105 of the stand 37, and in a bearing provided in one pair of arms 106 106$^a$, the same projecting upwardly from the posts 87 87$^a$, as shown by Fig. 11. This shaft 103 is parallel to the governor-driving shaft, and at one end it has a gear-pinion 116 made fast therewith, said gear-pinion having intermeshing engagement with the spur gear-wheel 50 on the governor-driving shaft 48, whereby said shaft 103 is geared directly with the shaft 46. Near its other end this shaft 103 is provided with a worm 107ª, the same intermeshing with a horizontally-disposed gear 108, which is provided with an upwardly-extending hub 109. This hub is fitted idly in a top plate 107, fastened securely to the upstanding arms 106 106ª, and to the upper end of this hub is fitted a washer 110, the latter resting upon the top plate 107. A threaded vertical shaft 111 is screwed into a female-threaded opening provided in the worm-gear and its hub, the upper end of said shaft receiving a nut 112, which bears against a washer 110, and thereby serves to make the shaft 111 fast with the worm-gear and to loosely retain said worm-gear 108 in a bearing-opening of the top plate 107. The worm-gear and the shaft are thus adapted to rotate together when the worm-gear 107ª is impelled by rotation of the shaft 103. Said shaft 111 extends downwardly from the worm-gear, so as to lie between the oppositely-revoluble friction-disks 92 93, and to the lower end of said threaded shaft is secured a friction driving-wheel 113, which is clamped firmly between a collar 114 and the nuts 115, all on the lower part of the threaded shaft, as shown by Fig. 11. It is evident that the rotation of the shaft 111 will cause rotation of the friction-wheel 113, which has frictional engagement at all times with the disks 92 93, so as to positively rotate the latter simultaneously in opposite directions and with equal angular velocity. It is evident that the nut 112 may be loosened and the spindle 111 may be adjusted in the worm-gear so as to vary the position of the driving-wheel 113 relative to the disks 92 93, and after such adjustment of the shaft 111 the nut 112 should be tightened to its former position in order to lock the shaft to the worm-gear. Said shaft 111 is thus capable of adjustment in a vertical direction in order that its friction-wheel 113 may engage at different points with the friction-disks 92 93 for the purpose of changing the speed thereof.

When starting up the motor, the threaded sleeve 51 is adjusted by turning it in a downward direction, the lock-nut 56 having been previously loosened, thus moving the valve-spindle 59 in a downward direction until the valve 66 occupies its midway position. The hand-wheel 36 may now be turned in the direction indicated by the arrow in Figs. 1 and 2, thereby turning the tubular shaft 19 and setting in operation the planet-gears, so as to rotate the nut 17 in the same direction, which has the effect of giving endwise movement to the spindle 20 and opening the gate, the bevel-gears 34 34ª being at rest because the pulleys 35 35ª are not driven by their belts. When the motor starts, the adjusting-sleeve 51 at the head of the governor should be restored to its former position in order to bring the governor up to the desired speed.

The operation of the regulator may be described substantially as follows: The governor is adjusted or set for its parts to work at a certain speed of the motor, and when normal conditions prevail the weights of the centrifugal governor revolve within a prescribed circle of greater diameter than that shown by Figs. 1, 3, and 4, which represent the parts at rest. With the governor rotating at the normal speed the piston-like valve 66 occupies a midway position in the valve-chamber—that is to say, its upper and lower end portions cover the half of each of the two sets or groups of ports, which are arranged substantially as indicated in Figs. 1 and 4. The motor-driven pulleys or elements 35 35ª being driven by belts simultaneously in opposite directions will cause the tubular shafts 18 19, and with them the two eccentrics 32 32ª, to rotate positively through the agency of the two trains of planet-gears, each of which trains of gears connects the motor-driven element or pulley with one tubular shaft and with one gear element or the bevel-gear of the nut 17, the direction of rotation of these parts being indicated by the arrows in Fig. 1. At this time the plungers of the two groups or sets of pumps are driven by the eccentrics on the tubular shafts, so as to reciprocate back and forth in the pump-barrels, thus causing the liquid to circulate through the pipes, the valve-pot, and the pumps. The two groups of ports in the valve-pot having exactly the same equal active area, the liquid resistance in both of the circulating systems will evidently be of equal magnitude, and in consequence of this condition the tubular shafts 18 19 will both rotate at equal angular velocity and in opposite directions, the angular velocity of each shaft being half of the velocity of the motor-driven element or pulley. The central element of the gate-actuating mechanism, consisting of the hub and the oppositely-facing gear elements, remains at rest or in a stationary position owing to the fact that the two trains of planet-gears offer equal frictional resistance, and the gate-actuating spindle 20 will also remain at rest. These conditions are changed, however, when a change of load begins to affect the governor by changing its speed. Assume an increase in load, causing a speed retardation of the generator, which is followed by a decrease in the speed of the centrifugal governor, thereby causing the weights to move inwardly and toward the vertical axis of the governor. This action is followed by an elevation of the head member 40 of the governor, and with it the sleeves 51 53, the valve-spindle 59, and the valve 66. The elevation of the valve diminishes the active area of the upper group of ports 62 and correspondingly increases the active area of the lower group of ports 62ª. The liquid resistance in the pipes 74 and the group of pumps 69ᵃ will in like manner be correspondingly increased, while said liquid resistance in the other pipe system, 73, and in the pumps 69 will be diminished, in consequence of which the motion of the tubular shaft 19 will be proportionately retarded and that of the other tubular shaft, 18, will be accelerated. The nut 17 will thus be caused to rotate in the bearing of the pillar 12 and in the direction indicated by the arrow 2, and this rotation of the nut communicates motion to the spindle 20, having the right-hand thread 20ᵃ, said spindle being propelled toward the right-hand side with respect to Fig. 1. The motion of the spindle is communicated to the turbine-gates, so as to open the latter, thereby increasing the speed of the turbine, and the centrifugal governor will be driven at a speed which will cause the weights to fly outward and again depress the valve 66. The regulator will continue to open the turbine until the governor-controlled valve has been returned to its normal position, and the liquid resistance in both of the circulating systems will thus be equalized and the nut 17 will again come to a state of rest. When the load drops off the generator, exactly the reverse operation takes place. The angular velocity of the nut 17, and therefore the speed with which the gate is moved a certain distance, differs proportionately to the magnitude of load changes. By selecting an appropriate tension for the governor-springs, the latter tending to force the governor head member in an upward direction, the governor can be adapted for close regulation of any particular power plant having a certain momentary maximum of load change. With said load changes the governor-controlled valve 66 should reach its limit of travel, in which instance one set of ports in the power-valve is entirely closed, while the other set is entirely opened. Then the time consumed by the regulator for adjusting the water-supply to different magnitude of load changes up to their maxima will be the same throughout, thereby attaining an ideal speed regulation. The movement of the spindle toward the right, as heretofore described, brings into action automatically the anticipating mechanism, which entirely overcomes the tendency of the motor to race. When the valve-spindle is raised by the action of the centrifugal governor, and the gate-actuating spindle 20, with its cross-head 23, is moved to the right to open the gate, the lever 76 is turned on its fulcrum by reason of its link connection through the post with the cross-head 23, thereby moving the cross-head 77 and the spindle 85 simultaneously in the left-hand direction with respect to Fig. 1. The rack 83 will be moved in unison with the spindle 85 and rotate the gear-pinion 61 and the spindle 59. Owing to said spindle having the left-hand thread, which engages with the adjusting-sleeve 51, said spindle 59 will be forced in a downward direction when it is rotated by the rack 83, thereby lowering the valve 66 to its midway position, whereupon the gate movement stops before normal speed is established. The reverse operation of the anticipating mechanism takes place when a drop in the load calls for a closing of the turbine-gate. When the spindle 85 is in its normal position, the friction-wheel 86 thereof lies opposite to and between the depressions or pockets 94 in the working faces of the oppositely-revoluble friction-disks 92 93. Hence the friction-wheel 86 will not be influenced or driven by the friction-disks; but when the spindle 85 and the rack-rod 83 have been displaced by the action of the anticipating mechanism, as previously explained, this friction-disk 86 is brought into engagement with said friction-disks, thereby rotating the spindle 85 in such a direction that the latter, owing to its threaded engagement with the cross-head 77, will gradually screw itself back to its normal position, so as to again bring the friction-wheel 86 opposite to the depressions 94 in the friction-disks, thereby disengaging the friction-wheel from the friction-disks and allowing the spindle 85 to come to rest. At the same time the rack-rod 83 will have been turned to its normal position, having all the while corresponding to its return motion gradually caused the water-supply to adjust itself fully to the demand. The difference between the diameters of the friction-disks 92 93 and the friction-wheel 86 on the revoluble and slidable spindle 85 will cause said friction-wheel 86 to attain higher initial speed with load changes of higher magnitude, because said friction-wheel 86, and with it the spindle 85, will be pushed farther away from the central position, and thereby change the ratio of the acting diameters of the friction-disks to the friction-wheel. Owing to this condition in the operation of the return mechanism the latter will exactly conform to different speeds of the gate movement, and therefore it will in a great measure conduce to a close-speed regulation of the water-motor.

Although I have shown and described a resistance mechanism which employs liquid as a circulating medium, I would have it understood that I do not restrict myself to a resistance mechanism of this type, because I am aware that other forms of resistance mechanism may be substituted for the style herein shown—as, for example, electromagnetic devices may be centrifugally governed and operatively connected with the oppositely-revoluble members of the gate-actuating mechanism to serve the purpose hereinbefore set forth.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a water-motor regulator, the combination of a gate-actuating mechanism including an endwise-movable threaded spindle engaging with a nut held at rest under normal load conditions by trains of positively-driven planet-gears, a resistance mechanism opposing the action of the planet-trains and including a power-valve, a centrifugal governor controlling said power-valve, a gate-anticipating mechanism operatively related to the power-valve, and a return mechanism operable on a member of the gate-anticipating mechanism, substantially as described.

2. In a water-motor regulator, the combination with a positively-movable gate-actuating mechanism, of a resistance mechanism opposing the action of said gate-actuating mechanism under normal load conditions, a gate-anticipating mechanism operatively related to the resistance mechanism and to the gate-actuating mechanism, and a return mechanism arranged to move with an accelerated motion an element of the resistance mechanism back to normal position and independent of the gate-anticipating mechanism, substantially as described.

3. In a water-motor regulator, the combination of a gate-actuating mechanism including trains of planet-gears positively driven in opposite directions and engaging a nut controlling a slidable threaded spindle, a resistance mechanism opposing the trains of planet-gears, a governor for said resistance mechanism, and an anticipating mechanism operatively related to the gate-actuating mechanism and to an element of the resistance mechanism to restore the latter to normal position irrespective of the gate-actuating mechanism, substantially as described.

4. In a water-motor regulator, a gate-actuating mechanism comprising trains of planet-gears, a nut engaging therewith, and a spindle connected with said nut, in combination with a centrifugally-governed resistance mechanism opposing the planet-gears, and an anticipating mechanism operatively related to the resistance mechanism, substantially as described.

5. In a water-motor regulator, a gate-actuating mechanism comprising a revoluble nonslidable nut, a spindle engaging therewith, and oppositely-driven trains of planet-gears engaging with said nut, in combination with centrifugally-governed resistance mechanism opposing the rotation of said trains of planet-gears, substantially as described.

6. In a water-motor regulator, a gate-actuating mechanism comprising a revoluble nonslidable nut, a spindle actuated thereby, tubular shafts concentric with said spindle, and independent trains of oppositely-driven planet-gears each having members carried by one tubular shaft and engaging with said nut, in combination with centrifugally-governed resistance mechanism opposing the trains of gears, substantially as described.

7. In a water-motor regulator, a gate-actuating mechanism comprising a revoluble nonslidable nut having gear elements, tubular shafts each carrying a gear meshing with one gear element of said nut, oppositely-revoluble motor-driven elements concentric with said tubular shafts and having gears meshing with the gears on the tubular shafts, and a spindle actuated by said nut, in combination with centrifugally-governed resistance mechanism opposing the trains of gears, substantially as described.

8. In a water-motor regulator, a gate-actuating mechanism comprising an endwise-movable spindle provided with screw-threads, tubular shafts concentric with said spindle and each provided with one or more gear elements, a nut disposed between the shafts, having threaded engagement with the spindle, and provided with gear elements in mesh with the gears on the tubular shafts, and motor-driven elements sleeved on the respective tubular shafts and having gears in mesh with those on said shafts, in combination with a resistance mechanism opposing the trains of planet-gears, substantially as described.

9. In a water-motor regulator, a gate-actuating mechanism comprising a threaded spindle, means for limiting said spindle to reciprocating movement in a rectilinear path, a nut having threaded engagement with the spindle, and oppositely-driven trains of planet-gears connected with the nut, in combination with a resistance mechanism opposing the trains of gears, substantially as described.

10. In a water-motor regulator, the combination of a gate-actuating mechanism having oppositely-driven members and a spindle controlled thereby, a resistance mechanism having a governor and operatively related to said oppositely-driven elements of the gate-actuating mechanism and adapted to equalize the resistance thereto, an anticipating mechanism between the gate-actuating mechanism and a governor-actuated member of the resistance mechanism, and a return mechanism connected to the anticipating mechanism and the governor-actuated member of the resistance mechanism and adapted to restore the latter with an accelerated movement to normal position and independently of the resistance mechanism, substantially as described.

11. In a water-motor regulator, the combination with a gate-actuating mechanism, and a centrifugally-governed resistance mechanism, of an anticipating mechanism including a lever, a cross-head limited to reciprocating movement, a spindle connected to the crosshead to travel therewith and capable of an independent rotary movement and having operative connection with the governor-controlled element of the resistance mechanism, a friction-wheel on said revoluble and slidable spindle, and a return mechanism having a positively-driven friction-disk adapted to engage with the friction-wheel and to restore the spindle with an accelerated motion to normal position, substantially as described.

12. In a water-motor regulator, the combination with a gate-actuating mechanism and a centrifugally-governed resistance mechanism therefor, of an anticipating mechanism consisting of a lever linked to an element of the gate-actuating mechanism, a slidable cross-head linked to the lever, a spindle having threaded engagement with said cross-head and adapted to be operatively connected with the resistance mechanism, a friction-wheel fast with said spindle, a friction-disk arranged to have frictional engagement with the wheel on displacement of the spindle to abnormal position, and means actuated by the governor-driving mechanism to drive the disk, substantially as described.

13. In a water-motor regulator, the combination with a gate-actuating mechanism, and a centrifugally-governed resistance mechanism therefor, of an anticipating mechanism comprising a lever fulcrumed to provide long and short arms, a link connecting the long arm of said lever with an element of the gate-actuating mechanism, a cross-head linked to the short arm of said lever, a spindle having threaded engagement with said cross-head and adapted to be connected with an element of the resistance mechanism, and a driving-gear whereby the spindle may be returned to normal position irrespective of movement of the lever, substantially as described.

14. In a water-motor governor, the combination of a lever, a cross-head limited to slidable movement and connected with said lever, a spindle having threaded engagement with said cross-head, and means for rotating said spindle, substantially as described.

15. In a water-motor governor, the combination of a lever, a cross-head connected therewith and arranged to be given a slidable movement thereby, a spindle having threaded engagement with the cross-head and arranged to be moved endwise thereby but capable of an independent axial rotation, and a friction driving-gear operatively disposed to said spindle and arranged to rotate the latter when moved to an abnormal position, substantially as described.

16. In a water-motor regulator, the combination with a gate-actuating mechanism including a cross-head as an element thereof, of a lever fulcrumed to provide long and short arms, a post attached to the cross-head and having a link connection with said lever, a cross-head also having a link connection with the lever, the pivot of the cross-head and the post being in the same plane as the fulcrum of the lever, a spindle actuated by the cross-head, and a friction-driving mechanism operatively related to the spindle, substantially as described.

17. In a water-motor regulator, the combination of a revoluble and slidable spindle provided with a friction-wheel, oppositely-rotating friction-disks operatively related to the friction-wheel and having depressions or pockets arranged to normally receive said friction-wheel, a tension device yieldably maintaining said friction-disks in position for engagement by the friction-wheel when the spindle is moved to an abnormal position, and means for driving said friction-disks, substantially as described.

18. In a water-motor regulator, the combination with a slidable and revoluble spindle provided with a friction-wheel, of a friction-disk having a central depression opposite which said friction-wheel is positioned in the normal position of the spindle, means for holding the friction-disk yieldably in the path of said friction-wheel on displacement of the spindle to abnormal position, and means for rotating said friction-disks, substantially as described.

19. In a water-motor regulator, the combination with a slidable and revoluble spindle provided with a friction-wheel, of friction-disks provided with pockets in their opposing faces and mounted for yieldable movement relative to said friction-wheel, an extension-spring having operative connection with said friction-disks, and means for frictionally driving said disks in opposite directions with equal angular velocity, substantially as described.

20. In a water-motor governor, the combination with a slidable and revoluble spindle provided with a friction-wheel, of headed shafts revolubly fitted in their bearings and having a limited endwise movement, friction-disks mounted on the shafts and operatively disposed to the friction-wheel of said spindle, levers engaging with said shafts, an extension-spring operatively related to the levers and normally forcing the friction-disks in the path of the friction-wheel on displacement of the spindle to an abnormal position, and means for driving the friction-disks simultaneously in opposite directions, substantially as described.

21. In a water-motor regulator, the combination with a slidable and revoluble spindle having a friction-wheel, and a governor-driving shaft, of a friction-disk in operative relation to the friction-wheel of said spindle, a worm-shaft geared to the governor-driving shaft, and a worm-gear having a spindle provided with a friction-wheel that is in engagement with said friction-disk, substantially as described.

22. In a water-motor regulator, the combination with a revoluble and slidable spindle having a friction-wheel, of a friction-disk in operative relation to said friction-wheel, a spindle adjustable across the face of the friction-disk and provided with a friction-wheel normally in engagement with said disk, and means for rotating said spindle, substantially as described.

23. In a water-motor regulator, the combination with a slidable and revoluble spindle having a friction-wheel, a friction-disk in operative relation thereto, a worm-gear supported adjacent to the friction-disk, a threaded spindle clamped to the worm-gear to rotate therewith, and also provided with a friction-wheel that engages with the friction-disk, and a worm-shaft meshing with said worm-gear, substantially as described.

24. In a water-motor regulator, the combination with a resistance mechanism having an endwise-movable spindle, and a gate-actuating mechanism operatively related to the resistance mechanism, of a centrifugal governor provided with a non-revoluble and slidable sleeve having threaded engagement with said endwise-movable spindle, substantially as described.

25. In a water-motor regulator, the combination with a gate-actuating mechanism, and a resistance mechanism having an endwise-movable spindle, of a centrifugal regulator having its members sleeved on a stationary column and provided with an adjusting-sleeve which is keyed to the column and has threaded engagement with said spindle, said regulator also including a sleeve having loose engagement with one regulator member and threaded engagement with said adjusting-sleeve, substantially as described.

26. In a water-motor regulator, the combination with a gate-actuating mechanism having oppositely-revoluble elements provided with pump-driving devices, of a resistance mechanism including independent circulating devices which are operatively connected with the pump-actuating devices and have communication with a common valve-chamber, and a centrifugally-governed valve fitted in said valve-chamber, substantially as and for the purposes described.

27. In a water-motor regulator, the combination with a gate-actuating mechanism including independently-driven elements provided with pump-actuating devices, of a resistance mechanism comprising a valve chamber or pot having two groups of ports each of equal active area, circulating-pumps having operative connection with the pump-driving devices, and circulating connections between each group of pumps and the ports of one group or series in the valve-chamber, substantially as described.

28. In a water-motor regulator, the combination with a gate-actuating mechanism having independently-driven pump-eccentrics, of a resistance mechanism including independent groups of pumps each group of which is connected in pairs with one eccentric, a valve-pot adapted to be filled with fluid and having two groups of ports of equal area, circulating-pipes between each group of pumps and the group of ports in the valve-pot, a shiftable valve arranged to vary the active area of the ports of each group, and a governor mechanism controlling said valve, substantially as described.

29. In a water-motor regulator, the combination of a valve-pot having feed and foot chambers in communication one with the other and adapted to have common communication with the valve-chamber, fluid-circulating pumps grouped in pairs at an angle to each other and with the pumps of one group connected for communication with the ports of one set in the valve-pot, means for driving said pumps, and a governed valve fitted in the valve-chamber of the pot and arranged in normal position for the fluid to circulate unobstructedly in all the parts of the circulating systems, substantially as described.

30. The combination of a revoluble and non-slidable nut, a spindle limited to endwise movement and having threaded engagement with said nut, tubular shafts concentric with the spindle and free to rotate independently of said spindle and of the nut, and independent trains of positively-driven planet-gears concentric with said shafts and having equal engagement with gear elements on said nut, substantially as described.

31. The combination of a nut provided with fast-gear elements, a spindle limited to endwise movement and having threaded engagement with said nut, tubular shafts operatively disposed relative to the spindle and the nut, sleeves loosely fitted on the tubular shafts and provided with gears and with motor-driven elements adapted to positively rotate the sleeves in opposite directions and at equal angular velocity, and planet-gears idly mounted on the tubular shafts and having engagement with the gear elements of the nut and with the gears of the sleeves, substantially as described.

In witness whereof I have hereunto set my hand in the presence of two witnesses.

AUGUST MEUSCHEL.

Witnesses:
   J. A. MARION,
   T. MYNARD.